United States Patent
Fogelin (10) Patent No.: US 12,295,275 B2
(45) Date of Patent: May 13, 2025

(54) AGRICULTURAL IMPLEMENT AND METHOD OF CONTROLLING AGRICULTURAL IMPLEMENT

(71) Applicant: Väderstad Holding AB, Väderstad (SE)

(72) Inventor: Jonas Fogelin, Ödeshög (SE)

(73) Assignee: Väderstad Holding AB, Väderstad (SE)

( * ) Notice: Subject to any disclaimer, the term of this patent is extended or adjusted under 35 U.S.C. 154(b) by 754 days.

(21) Appl. No.: 17/614,186

(22) PCT Filed: May 28, 2020

(86) PCT No.: PCT/SE2020/050541
§ 371 (c)(1),
(2) Date: Nov. 24, 2021

(87) PCT Pub. No.: WO2020/242372
PCT Pub. Date: Dec. 3, 2020

(65) Prior Publication Data
US 2022/0248590 A1    Aug. 11, 2022

(30) Foreign Application Priority Data
May 29, 2019    (SE) .................................... 1950642-7

(51) Int. Cl.
*A01B 63/16*    (2006.01)
*A01B 49/02*    (2006.01)
(Continued)

(52) U.S. Cl.
CPC ............ *A01B 63/22* (2013.01); *A01B 49/027* (2013.01); *A01B 63/111* (2013.01)

(58) Field of Classification Search
CPC ..... A01B 49/027; A01B 61/046; A01B 63/16; A01B 63/22; A01B 63/24; A01B 63/32; A01B 63/111; A01B 79/00
See application file for complete search history.

(56) References Cited

U.S. PATENT DOCUMENTS

| 6,035,943 A | 3/2000 | Gerein et al. |
| 7,063,167 B1 * | 6/2006 | Staszak .................. A01B 63/22 172/322 |

(Continued)

FOREIGN PATENT DOCUMENTS

| EP | 3395135 A1 | 10/2018 |
| FR | 2861532 A1 | 5/2005 |

(Continued)

*Primary Examiner* — Adam J Behrens
*Assistant Examiner* — Robert E Pezzuto
(74) *Attorney, Agent, or Firm* — COATS & BENNETT, PLLC (57) ABSTRACT

An agricultural implement comprises a main frame (11), which carries a plurality of soil working tools (32), a first support frame (12a), which is pivotally connected to the main frame (11) via a first support frame joint (21a) and which carries at least one first rolling ground support (31a), such as a wheel or a roller, a control lever (13) rotatably connected to the main frame (11) via a control lever joint (22), a support frame control link (14) rotatably connected to the control lever via a first support frame control link joint (23a) and which is pivotally connected to the support frame (12) via a second support frame control link joint (23b) so that rotation (V1) of the control lever (13) around the control lever (22) provides rotation (V2) of the first support frame (12a) relative to the main frame (11), wherein the control lever (13) is rotatable in a first direction of rotation (V1) so that the first support frame control link joint (23a) can pass a line (C1) through rotation centers of the control lever joint (22) and the second support frame control link joint (23b) and wherein the first support frame (12a), when the first support frame control link joint (23a) passes the line (C1), changes direction of rotation (−V2).

19 Claims, 4 Drawing Sheets

(51) Int. Cl.
   *A01B 63/111*   (2006.01)
   *A01B 63/22*    (2006.01)

(56) References Cited

U.S. PATENT DOCUMENTS

| | | | |
|---|---|---|---|
| 9,681,598 B2 * | 6/2017 | Anderson | A01B 63/22 |
| 10,729,054 B2 * | 8/2020 | DeKam | A01B 63/16 |
| 2012/0111584 A1 | 5/2012 | Palen | |
| 2014/0262368 A1 | 9/2014 | Landoll et al. | |
| 2016/0249521 A1 | 9/2016 | Sudbrink et al. | |
| 2017/0079194 A1 | 3/2017 | Janelle et al. | |

FOREIGN PATENT DOCUMENTS

| | | |
|---|---|---|
| FR | 2967546 A1 | 5/2012 |
| WO | 2012125109 A1 | 9/2012 |
| WO | 2014056077 A1 | 4/2014 |

* cited by examiner

AGRICULTURAL IMPLEMENT AND METHOD OF CONTROLLING AGRICULTURAL IMPLEMENT

TECHNICAL FIELD

This document relates to an agricultural implement and a method of setting working depth and transport position for an agricultural implement.

BACKGROUND

There is a number of very large cultivators on the market, which comprise a plurality of different tool types and which are designed to be pulled by a traction vehicle, rather than to be suspended on the traction vehicle.

Such cultivators may comprise a number of soil working tools, such as, but not limited to, harrow tines, cultivator tines, levelling tools, harrow discs and straw harrow tines. A cultivator may also be fitted with devices for distributing, e.g. fertilizer or seed to ground over which it travels.

Furthermore, a cultivator may form part of a seeder. Hence, the soil working tools may comprise e.g. seed coulters, seed discs, fertilizer coulters or the like.

Furthermore, such a cultivator may be provided with one or more rollers, which may be designed for different purposes, usually for repacking the soil.

In addition, it may be desirable to provide the cultivator with one or more support wheels.

In the case of towed cultivators, it is sometimes desirable to provide it with rolling supports, such as rollers or wheels, both in front of and behind a set of soil working tools, so that, with the aid of said rolling support, it is possible to set the working depth of the soil working tools and to limit undesirable disturbances in the pattern of movement of the agricultural implement, such as self-oscillations.

For this purpose, it is desirable to be able to control both the front and rear rolling supports' height position in relation to the part of the agricultural implement carrying the soil working tools.

One challenge, however, is that thus placed rolling aid, especially if the distance between front and rear rolling supports is large, helps to make the agricultural implement difficult to maneuver, for example when turning. A known solution to this is that the front and/or the rear rolling supports are made rotatable about a vertical axis, i.e. they are given the ability to pivot. However, this requires a control mechanism which can be complicated to provide, and thus expensive, or a pivot joint, which is subject to wear and thus requires maintenance and associated cost.

Thus, there is a need for an improved agricultural implement.

SUMMARY

An object of this document is to provide an improved agricultural implement, and in particular an agricultural implement that can be provided with both front and rear rolling supports as well as soil working tools, arranged therebetween, which is height adjustable, has good maneuverability and low cost.

The invention is defined by the appended independent claims. Embodiments are apparent from the dependent claims, from the following description, and from the accompanying drawings.

According to a first aspect, an agricultural implement is provided, comprising a main frame, which carries a plurality of soil working tools, a first support frame, which is pivotally connected to the main frame via a first support frame joint and which carries at least one first rolling ground support, such as a wheel or a roller, a control lever, which is pivotally connected to the main frame via a control lever joint, a support frame control link, which is pivotally connected to the control lever via a first support frame control link joint and which is pivotally connected to the first support frame via a second support frame control link joint, such that rotation of the control lever around the control lever joint provides rotation of the first support frame relative to the main frame, wherein the control lever is rotatable in a first direction of rotation such that the first support frame control link joint can pass a line through rotation centers of the control lever joint and of the second support frame control link joint, and wherein the first support frame, when the first support frame control link joint passes the line, changes direction of rotation.

With such an arrangement, it is possible, with the aid of an applied force acting in one direction, to cause the first support frame to first be rotated in a first direction and then to change direction of rotation, without the need for the force to change direction of rotation.

The second support frame control link joint can be offset in a normal direction from a line through rotation centers of the control lever joint and the first support frame joint.

The control lever may have a first lever portion extending in a first direction from the control lever joint and a second lever portion extending in a second direction from the control lever joint, the first support frame control link joint being located at a distal portion of the first lever portion.

The lever portions may, but need not, be formed as legs of an angled part, which extend in different directions from the control lever joint, as illustrated in the drawings.

The first and second directions may present a mutual angle of 60-150 degrees, preferably 80-150 degrees or 100-150 degrees.

The agricultural implement may further comprise a second support frame which is pivotally connected to the main frame via a second support frame joint and which carries at least one second rolling ground support, such as a wheel or a roller, and a synchronization link which is pivotally connected to the control lever via a first synchronization link joint and which is pivotally connected to the second support frame via a second synchronization link joint, so that the rotation of the first support frame around the first support frame joint is synchronized with the rotation of the second support frame around the second support frame joint.

Through this arrangement, it is possible to set a working height of the agricultural implement by pivoting the first and second support frames synchronously, and when the agricultural implement has reached a certain height, pull in one support frame, and this with the help of a single actuator.

The first synchronization link joint may be located at a distal portion of the second lever portion.

The agricultural implement may further comprise an actuator which is arranged to directly or indirectly control the rotational position of the first support frame relative to the main frame.

The actuator can advantageously be a hydraulic actuator. The principles shown herein can also be used in, for example, a hydraulic or electric actuator. Specifically, the actuator may be a linear actuator. However, it is possible instead to use an actuator that produces a rotary motion, such as a hydraulic, pneumatic or electric motor.

The actuator can be pivotally connected to the main frame via a first actuator joint and the actuator is pivotally connected to one of the support frames via a second actuator joint.

The second actuator joint may be provided on the second support frame.

The second actuator joint may be offset by a first distance in a normal direction from a line through rotation centers of the first actuator joint and the second support frame joint.

The second synchronization link joint may be offset by a second distance in a normal direction from a line through rotation centers of the first actuator joint and the second support frame joint.

Said first distance may be greater than said second distance.

Seen in a forward direction of the agricultural implement, the first and second support frames may be arranged on opposite sides of the main frame.

Said rolling ground support of at least one of the support frames may comprise at least two rolling bodies whose rotational axes are displaced in the forward direction of the agricultural implement, and said at least one of the supporting frames may comprise a parallel linkage, which is configured to hold said rotational axes at substantially the same relative height of the supporting frame. relative to the main frame.

According to a second aspect, a method of controlling an agricultural implement is provided, which agricultural implement comprises a main frame, which carries a plurality of soil working tools, a first support frame, which is pivotally connected to the main frame via a first support frame joint and which carries at least a first rolling ground support, such as a wheel or a roller, a control lever which is pivotally connected to the main frame via a control lever joint, a support frame control link, which is pivotally connected to the control lever via a first support frame control link joint and which is pivotally connected to the first support frame via a second support frame control link joint. The method comprises causing the control lever to rotate in a first direction so that, during a first portion of said rotation of the control lever in said first direction, the first support frame is rotated in a first direction, and so that during a second part of said rotation of the control lever in the first direction, the first support frame is rotated in a second, opposite, direction.

Said first portion of said rotation of the control lever may be carried out while the first support frame control link joint is on a first side of a line through centers of rotation of the control lever and of the second support frame control link joint, and said second part of said rotation of the control lever may be carried out while the first support frame control link joint is on a second, opposite, side of the line.

The agricultural implement may further comprise a second support frame which is pivotally connected to the main frame via a second support frame joint and which carries at least one second rolling ground support, such as a wheel or a roller. The method then comprises, during said first part of said rotation of the control lever, rotating said first and second support frames relative to the main frame, so that the main frame is raised relative to a ground level, and during said second part of said rotation of the control lever rotating the first support frame so that the first support frame is raised relative to the ground level.

The method may further comprise, during said second part of said rotation of the control lever, continuing to rotate the second support frame, so that the main frame is raised further relative to the ground level.

Said first and second parts of said rotation of the control lever can be carried out in connection with the completion of a run over ground to be worked, so that said soil working tools are first brought out of engagement with the ground and then the first support frame is lifted.

DETAILED DESCRIPTION

In the following, the concepts shown herein will be explained with reference to an agricultural implement 1 in the form of a cultivator. However, it will be appreciated that the concept is applicable to other types of agricultural implements, and in particular agricultural implements for tillage, i.e. agricultural implements which have some form of soil working tools, such as, but not limited to harrow tines, cultivator tines, levelling tools, harrow discs, straw harrow tines, seed coulters, seed discs, fertilizer coulters or the like.

Figure 1:
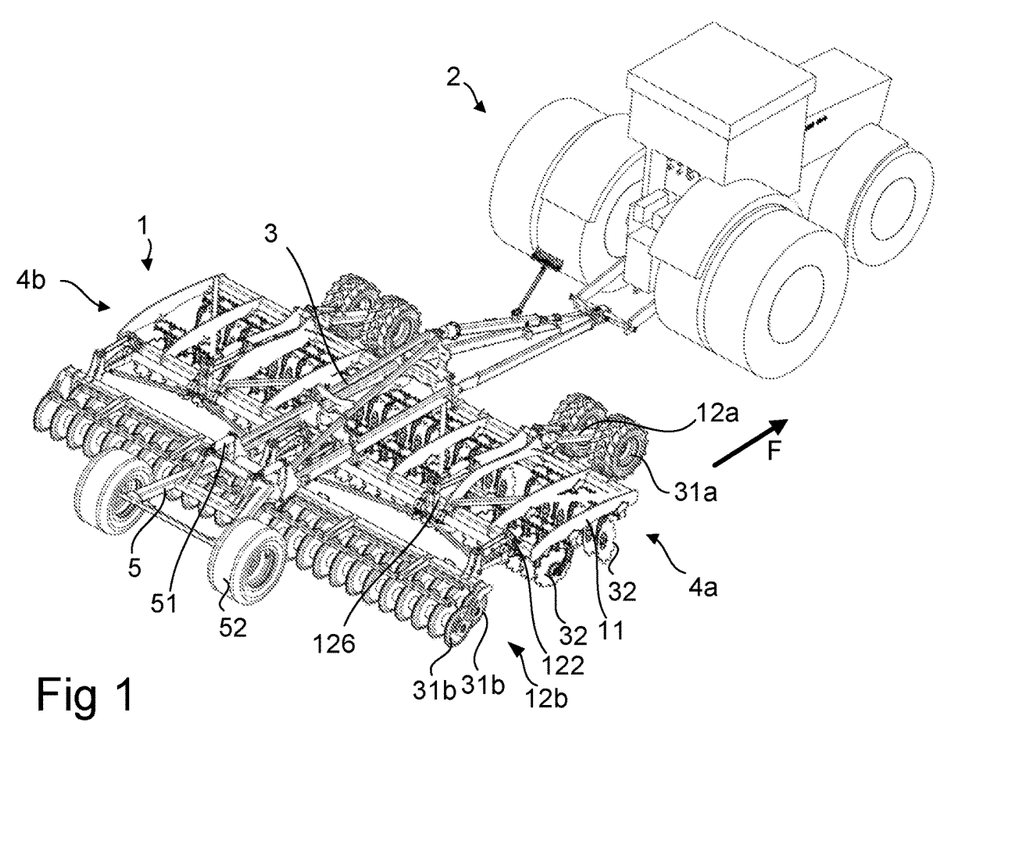
FIG. 1 shows an agricultural implement coupled to a tractor vehicle.

The agricultural implement 1 shown in FIG. 1 is designed to be towed after a traction vehicle 2, such as a tractor. The agricultural implement 1 is designed for ground engagement when it is pulled in a forward direction F.

The agricultural implement 1 shown here is of a type comprising a center frame 3 as well as a pair of side sections 4a, 4b, which can be folded up to transport position relative to the center frame 3. In this embodiment, the center frame lacks soil working tools. A transport wheel frame 5 can be connected to the center frame 3. The orientation of the transport wheel frame 5 relative to the center frame 3 can be controlled with one or more separate actuators 51, so that the transport wheels can be folded up from the ground when the implement 1 is in working position. One or more transport wheels 52 may be provided on the transport wheel frame 5.

Each of the side sections 4a, 4b may comprise a main frame 11, a first support frame 12a and a second support frame 12b. In the example shown, the first support frame 12a is located in front of the main frame 11, as seen in the forward direction F, and the second support frame 12b is located behind the main frame 11.

The main frame 11 carries a plurality of soil working tools 32, shown here in the form of a pair of sets of harrow discs, spaced apart in the forward direction F.

The first support frame 12a carries a first rolling support 31a, here in the form of wheels, and the second support frame 12b carries a second rolling support 31b, here in the form of a pair of sets of rollers, which are spaced apart in the forward direction F.

In the following, a mechanism for adjusting one of the support frames 12a, 12b will be shown with reference to FIGS. 2a-2c. In the example shown, the setting of the first support frame 12a is shown. Specifically, in FIGS. 2a-2c, a mechanism is shown which allows, by means of a single movement in a direction D, during a first part of this movement to increase the distance of the main frame 11 to the ground by folding down a ground support 31a and during a second part of this movement in the direction D to switch to pulling up the ground support 31a.

The first support frame 12a is pivotally connected to the main frame 11 via a first support frame joint 21a and carries at least one rolling support 31a, such as a wheel or a roller.

A control lever 13 which is pivotally connected to the main frame 11 via a control lever link 22. The control lever 13 is pivotally connected to a support frame control link 14 via a first support frame control link joint 23a, which is spaced from the control lever joint 22. The support frame control link 14 is pivotally connected to the first support frame 12 a second support frame control link joint 23b located at a distance from the first support frame joint 21a.

Thus, the main frame 11, the support frame control link 14, the control lever 13 and the first support frame 12a form a 4-sided polygon with the joints 21a, 22, 23a, 23b as corners.

Thus, rotation of the control lever 13 around the control lever joint 22 controls a mutual angle between the main frame 11 and the first support frame 12a.

By designing the control lever 13, and in particular the distance between the control lever joint 22 and the first support frame control link joint 23a and the length of the support frame control link 14 and the location of the second support frame control link joint 23b, so that the first support frame control link joint 23a can pass a line C between rotation centers of the control lever joint 23 and the second support frame control link joint 23b, the first support frame 12a may be caused to move first downwards and then upwards as the control lever 13 is rotated in one direction. As the first support frame control link joint 23a crosses the line C, a direction of rotation V2 of the first support frame 12a will change sign, even though a direction of rotation V1 of the control lever 13 is unchanged.

Thus, by means of a motion/force in a direction D, such as a linear motion or a rotational motion, it is possible to cause the first support frame to first move in a direction V2 and then change to the opposite direction of motion −V2.

To adjust the angular position of the control lever 13, a torque can be applied to it. For example, the torque can be achieved by applying a force at a distance from the control lever joint 22.

In the illustrated example, the control lever 13 has been designed as an angled portion with two legs 131, 132, where the control lever joint 22 is located where the legs 131, 132 intersect and where the legs extend in different directions from the control lever joint.

The control force is applied here via a synchronization link 15, which can attack the second leg 132 via a first synchronization link joint 24a.

The synchronization link 15 may be connected to another part of the agricultural implement or to an actuator. The synchronization link 15 may form part of a linear actuator.

Figure 2A:
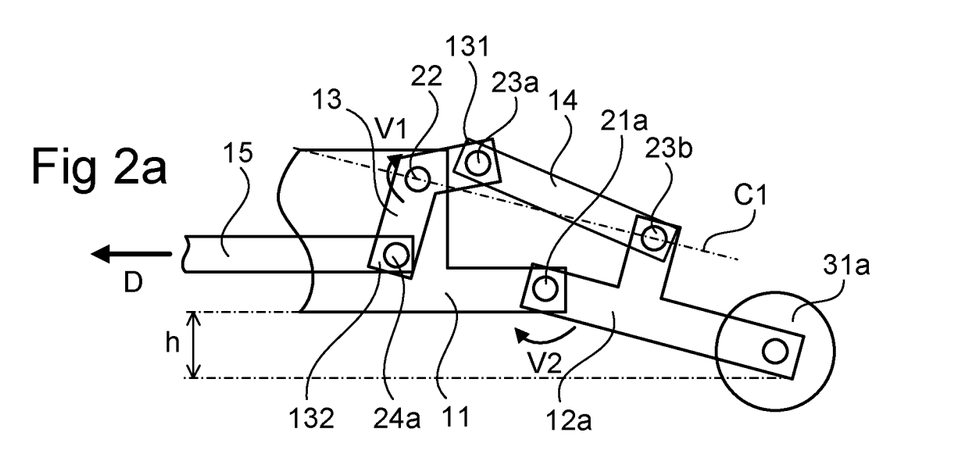
FIGS. 2a-2c show an adjustment mechanism for an agricultural implement.

In FIG. 2a, the arrangement is shown in a first range of motion, where a pulling force on the synchronization link 15 in the direction D causes rotation of the control lever 13 in the direction V1, which in turn causes the rotation of the first support frame 12a in the direction V2. If the first support frame 12a acts as a ground support, the height h will increase by continued application of the force in the direction D1.

Figure 2B:
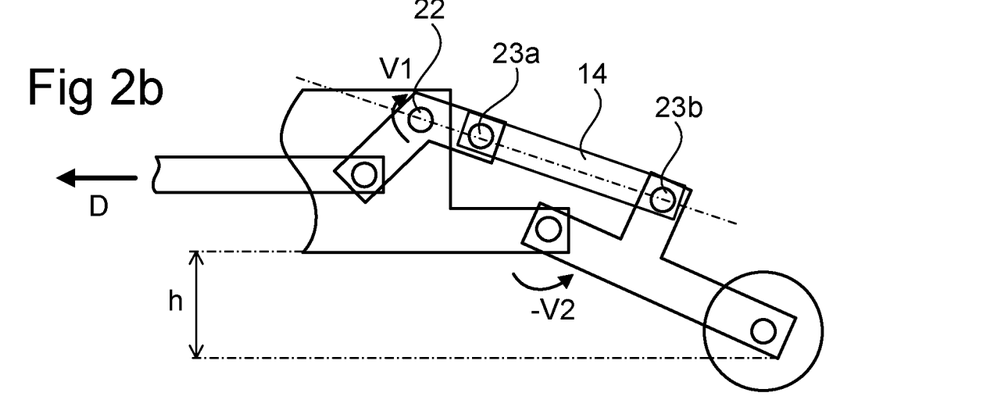

In FIG. 2b, the arrangement is shown in a boundary position, where the first support frame control link joint 23a is on a line between the control lever joint 22 and the second support frame control link joint 23b. In this position, the height h reaches its maximum.

Figure 2C:
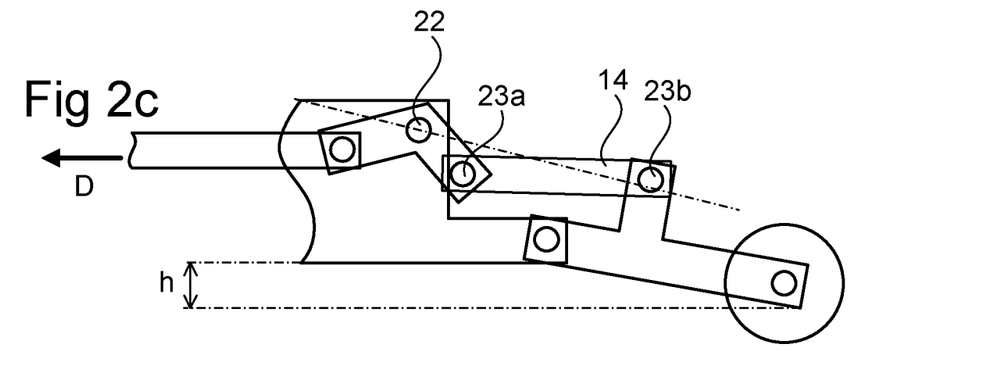

In FIG. 2c, the arrangement is shown in a second range of motion, where a continued pulling force on the synchronization link 15 in the direction D causes rotation of the control lever in the opposite direction, i.e. −V2, so that the height h again decreases.

The arrangement shown in FIGS. 2a-2c can be utilized on a towed agricultural implement as will be shown below. Alternatively, it can be used on a partially supported agricultural implement, where the first support frame 12a may constitute a rear support of the agricultural implement, a front support being provided by the traction vehicle 2.

An application of the arrangement described above to a drawn agricultural implement 1 will now be described with reference to FIGS. 3a-3f, which show an agricultural implement in the form of a cultivator in six different positions.

The agricultural implement shown in FIGS. 3a-3f is the same as shown in FIG. 1. This agricultural implement thus comprises a center frame 3 and a pair of foldable side sections 4a, 4b. The side sections each have a main frame 11 and a pair of support frames 12a, 12b, which are arranged in front of and behind the main frame 11, respectively, seen in the forward direction F.

It will be appreciated that a configuration in which a section consists of a main frame 11 thus shown and supporting frames 12a, 12b can be used on agricultural implements having only a single section (as shown in FIG. 1), on agricultural implements having two foldable sections, on agricultural implements which has a center section and two foldable side sections (three-part), on agricultural implements that have two fold-up side sections on each side of a center frame (four-part) and on agricultural implements that have a middle section and two fold-up side sections on each side of the center section (five-part).

However, the agricultural implement 1 shown in FIGS. 1 and 3a-3f is indivisible, and thus comprises a main frame 11, a first supporting frame 12a, which carries at least one first rolling support 31a and a second supporting frame 12b, which carries at least one second rolling support 31b.

The second support frame 12b may be designed in the same manner as the first support frame, i.e., the second support frame 12b may be pivotable relative to the main frame 11 around a second support frame joint 21b, the second support frame 12b supporting a second ground support 31b, which may be one or a set of wheels or one or a set of rollers. Preferably, all ground supports 31b included in such a set, such as wheels or rollers, have a substantially common axis of rotation.

Figure 3A:
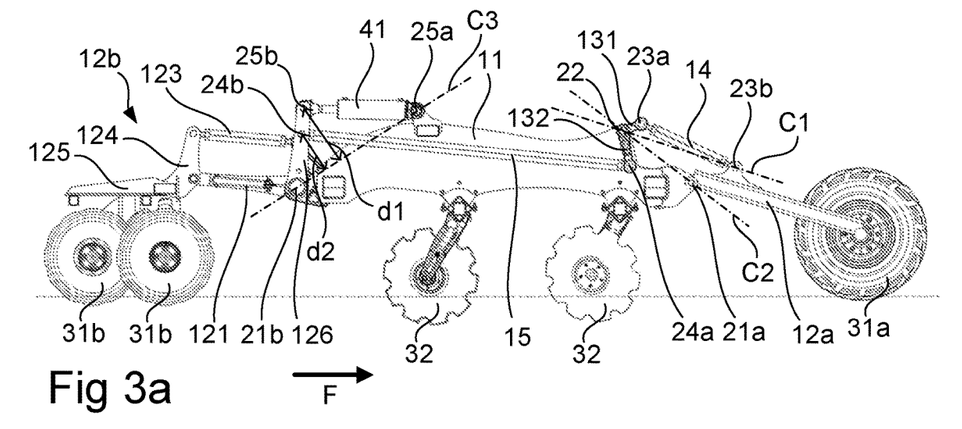
FIGS. 3a-3f show an agricultural implement with such an adjustment mechanism.
Figure 3B:
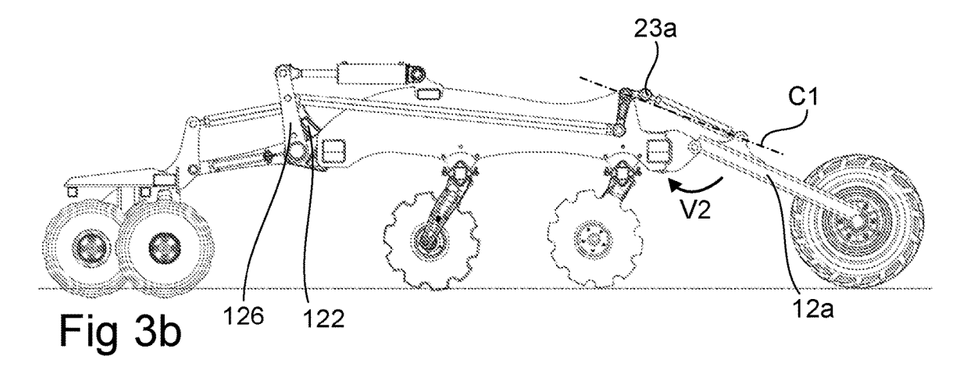

In the arrangement shown in FIGS. 1 and 3a-3b, the rear support frame 12b comprises two sets of rollers whose rotational axes are offset relative to each other in the forward direction F.

In addition, the rollers may, but need not, be divided into two or more laterally spaced roller portions. These can be mounted in the same support frame, or in separate support frames. The support frames may be individually adjustable and/or individually foldable, as described herein.

Similarly, each section may have one or more support wheels or pairs of support wheels, which may be maneuverable as described herein. In order that a couple of sets of ground supports 31b whose rotational axes are displaced relative to each other in the forward direction should exert equal pressure on the ground, or alternatively have the same working depth, it is advantageous to ensure that their rotational axes are at the same height relative to each other regardless of how the working depth of the agricultural implement has been set.

Thus, in addition to the parts described with reference to FIGS. 1 and 2a-2c, the second support frame 12b of the agricultural implement 1 includes a parallel link arrangement, which comprises first and second substantially horizontal links 121, 123 and first and second substantially vertical links 122, 124, which are configured and designed so that the support frame has a ground support carrying portion 125, i.e. a portion with which the ground supports 31b are rotatably connected, which maintains constant mutual height of the rotational axes of the ground supports 31b.

A first of the vertical links 122 may be fixed or fixably disposed relative to the main frame 11, wherein a second of the vertical links 124 is fixed or fixably disposed relative to the ground support carrying portion 125.

The horizontal links 121, 123 may be pivotally connected to spaced apart portions of the vertical links 122, 124 so that a predetermined mutual orientation between the main frame 11 and the ground support carrying portion 125 of the support frame can be maintained. For this purpose, one of the horizontal links 121, 123 may be of adjustable type, for example in the form of turnbuckle-like type.

It will be appreciated that the first support frame 12a can be designed in the same manner as the second support frame 12b shown in FIGS. 1 and 3a-3f, if it is desirable to provide it with two or more sets of ground supports 31a displaced in the forward direction.

The actuator 41 operates between the main frame 11 and the second support frame 12b. For this purpose, the actuator may be pivotally connected to the main frame 11 via a first actuator joint 25a and rotatably connected to a support frame lever 126 via a second actuator joint 25b.

The support frame lever 126 is fixed or fixable relative to one of the horizontal links 121, so that an angle between the support frame lever and the horizontal link 121 can be kept constant.

Also, the synchronization link 15 can be pivotally connected to the support frame lever 126 via a second synchronization link 24b, so that the movement of the synchronization link 15 in the direction D is accomplished by the support frame lever 126. The actuator 41 can, but does not have to, be connected to the support frame lever 126 at a greater distance from the first support frame joint 21b than the synchronization link 15.

Alternatively, the synchronization link 15 may be pivotally connected to a separate synchronization lever (not shown), which may also be fixed or fixable relative to one of the horizontal links 121, such that an angle between the synchronization lever and the horizontal link 121 is constant.

Figure 3C:
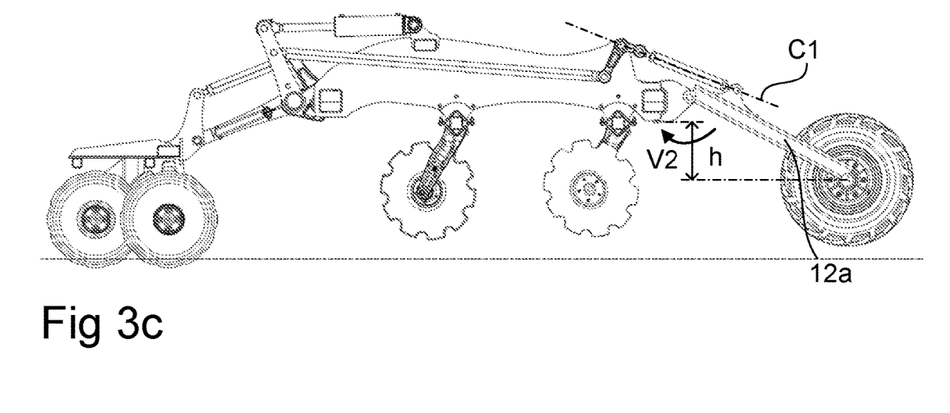

Specifically, FIGS. 3a-3c show the movements of the agricultural implement in the first part of the range of motion, where the working depth of the tools 32 is adjusted.

In FIG. 3a, the agricultural implement is in a position where the actuator 41 is in a retracted end position and where the working depth of the tool 32 is greatest.

In FIG. 3b, the actuator 41 has been slightly extended, with the support frames pressed downwards and the main frame 11 thereby raised, so that the tools 32 barely touch the ground surface. The first support frame control link joint 23a is still above the line C1 and the first support frame 12a has been turned in the direction V2.

In FIG. 3c, the actuator 41 has been further extended and the tools 32 have been lifted out of engagement with the ground. The first support frame control link joint 23a is still just above line C1, which means that the first support frame 12a is still turned in the direction V2.

Figure 3D:
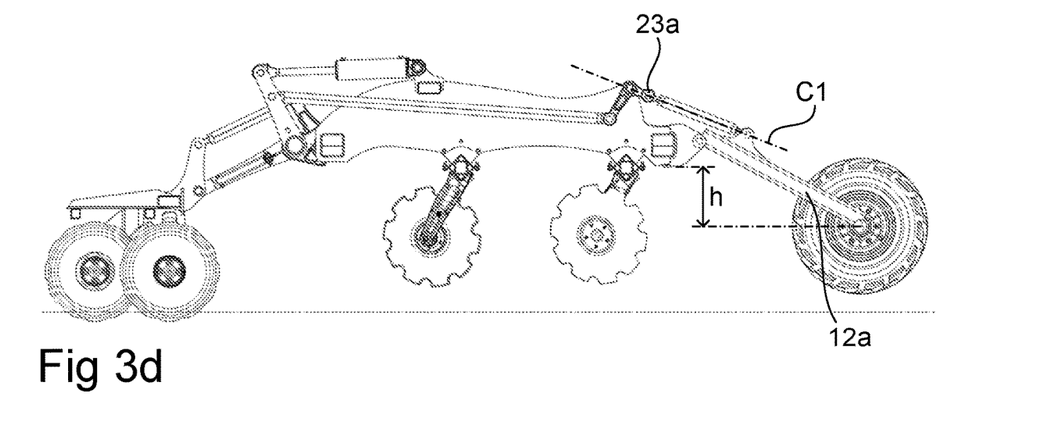

FIG. 3d shows the center position, where all the joints 22, 23a, 23b are on the line C1, and where the first support frame 12a is in its lower extreme position, which means that the height h is at its maximum.

Figure 3E:
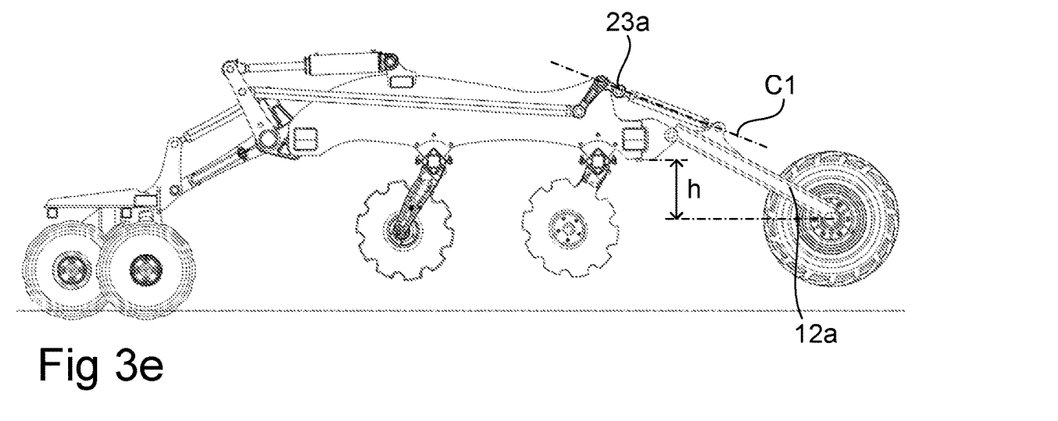

FIG. 3e shows the movements of the agricultural implement in the second part of the range of movement, where the support frame control link joint 23a passed the line C1 and the wheel 31a has started to raise, so that the height h has started to decrease.

Figure 3F:
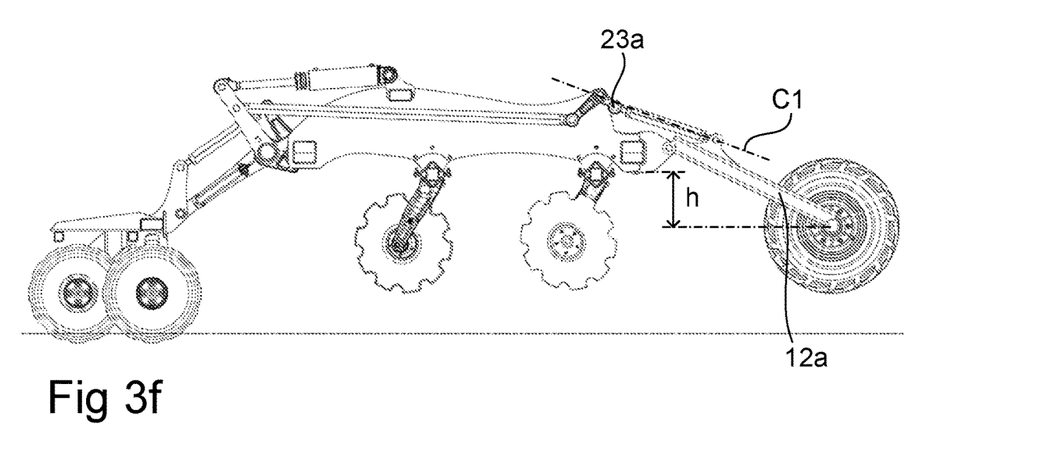

FIG. 3f shows the agricultural implement in its highest position, with the first support frame 12a at its upper position.

The joints discussed above may include sliding or rolling bearings. Each of the joints may be arranged to allow rotation about a respective geometric axis. The geometric axes of the various joints of a section, or of all sections that form part of the agricultural implement, can be substantially parallel to one another.

When using the agricultural implement 1 for tillage, this can be advanced over a land to be worked or sown, such as a field, with the tools 32 in a working position, the working depth of which can be set between the position shown in FIG. 3a and the position shown in FIG. 3b. Adjustment by operating the actuator 41 can be done in connection with commencement of work, continuously during ongoing work or at regular intervals during ongoing work.

When the agricultural implement 1 is approaching a work stoppage, such as a turnaround, where the working direction of the agricultural implement is to shift sharply, such as about 90-180 degrees seen in a horizontal plane, the actuator 41 is operated so that the agricultural implement 1 is raised past the position shown in FIGS. 3c-3d, whereby the soil working tools are removed from engagement with the ground.

With this elevation, the first support frame control link joint 23a passes the line C1, and thus the first support frame 12a, which in this case is the front support frame 12a, changes direction of rotation around the first support frame joint 21a, so that the first support frame 12a instead rotates in the direction −V2 and thus begins to pull up, as shown in FIGS. 3e-3f. Thus, the wheel 31a is removed from the abutment with the ground, which facilitates the turning.

After the turning is performed, the actuator 41 is retracted, the first support frame 12a being lowered by rotation in the direction V2 until the first support frame control link joint 23a again crosses the line C1, whereby the first support frame 12a again starts to rotate in the direction −V2 to lower the implement and thus increase the working depth, and in the direction V2, respectively, to raise the implement and thereby reduce the working depth.

It will further be appreciated that the support frames 12a, 12b can switch places so that the rear support frame 12b is lifted, instead of as shown above, the front support frame 12a is lifted.

The invention claimed is:
1. An agricultural implement, comprising:
a main frame which carries a plurality of soil working tools,
a first support frame which is pivotally connected to the main frame via a first support frame joint and which carries at least one first rolling ground support,
a control lever which is pivotally connected to the main frame via a control lever joint,
a support frame control link which is pivotally connected to the control lever via a first support frame control link joint and which is pivotally connected to the first support frame via a second support frame control link joint, so that rotation of the control lever around the control lever joint provides rotation of the first support frame relative to the main frame, wherein the control lever is rotatable in a first direction of rotation so that the first support frame control link joint can pass a line through centers of rotation of the control lever joint and the second support frame control link joint, and wherein the first support frame, when the first support frame control link joint passes the line, changes direction of rotation.

2. The agricultural implement of claim 1, wherein the second support frame control link joint is offset in a normal direction from a line through centers of rotation of the control lever joint and the first support frame joint.

3. The agricultural implement according to claim 1, wherein the control lever has a first lever portion extending in a first direction from the control lever joint and a second lever portion extending in a second direction from the control lever joint, wherein the first support frame control link joint is located at a distal portion of the first lever portion.

4. The agricultural implement according to claim 3, wherein the first and second directions have a mutual angle of 60-150 degrees.

5. The agricultural implement according to claim 3, further comprising a second support frame which is pivotally connected to the main frame via a second support frame joint and which carries at least one second rolling ground support, and
   a synchronization link which is pivotally connected to the control lever via a first synchronization link joint and which is pivotally connected to the second support frame via a second synchronization link joint,
   so that the rotation of the first support frame around the first support frame joint is synchronized with the rotation of the second support frame around the second support frame joint.

6. The agricultural implement according to claim 5, wherein the first synchronization link joint is located at a distal portion of the second lever portion.

7. The agricultural implement according to claim 5, further comprising an actuator, which is arranged to directly or indirectly control the rotational position of the first support frame relative to the main frame.

8. The agricultural implement according to claim 7, wherein the actuator is pivotally connected to the main frame via a first actuator joint and wherein the actuator is pivotally connected to one of the support frames via a second actuator joint.

9. The agricultural implement according to claim 8, wherein the second actuator joint is arranged on the second support frame.

10. The agricultural implement according to claim 8, wherein the second actuator joint is offset by a first distance in a normal direction from a line through centers of rotation of the first actuator joint and the second support frame joint.

11. The agricultural implement according to claim 8, wherein the second synchronizing link joint is offset by a second distance in a normal direction from a line through rotation centers of the first actuator joint and the second support frame joint.

12. The agricultural implement according to claim 11 wherein the second synchronizing link joint is offset by a second distance in a normal direction from a line through rotation centers of the first actuator joint and the second support frame joint and wherein said first distance is greater than said second distance.

13. The agricultural implement according to claim 5, wherein, seen in a forward direction of the agricultural implement, the first and second support frames are arranged on opposite sides of the main frame.

14. The agricultural implement according to claim 1, wherein said rolling ground support of at least one of the support frames comprises at least two roller bodies, whose rotational axes are displaced in the direction of travel of the agricultural implement, and
   said at least one of the support frames comprises a parallel linkage, which is configured to hold said rotational axes at a substantially same mutual height regardless of the rotational position of the support frame relative to the main frame.

15. A method of controlling an agricultural implement, which agricultural implement includes:
a main frame carrying a plurality of soil working tools;
a first support frame which is pivotally connected to the main frame via a first support frame joint and which carries at least a first rolling ground support,
a control lever which is pivotally connected to the main frame via a control lever joint,
a support frame control link which is pivotally connected to the control lever via a first support frame control link joint and which is pivotally connected to the first support frame via a second support frame control link joint,
the method comprising:
causing the control lever to rotate in a first direction,
so that, during a first portion of said rotation of the control lever in said first direction, the first support frame is rotated in a first rotation direction of the first support frame, and
so that during a second portion of said rotation of the control lever in said first direction, the first support frame is rotated in a second, opposite, rotation direction of the first support frame.

16. The method of claim 15, wherein said first portion of said rotation of the control lever is performed while the first support frame control link joint is on a first side of a line through centers of rotation of the control lever joint and the second support frame control link joint; and
   wherein said second portion of said rotation of the control lever is performed while the first support frame control link joint is on a second, opposite, side of the line.

17. The method of claim 15, wherein the agricultural implement further comprises a second support frame which is pivotally connected to the main frame via a second support frame joint and which carries at least one second rolling ground support,
   wherein the method comprises:
   rotating said first and second support frames relative to the main frame during said first part of said rotation of the control lever, so that the main frame is raised relative to a ground level, and
   during said second part of said rotation of the control lever, rotating the first support frame so that the first support frame is raised relative to the ground level.

18. The method of claim 17, further comprising, during said second portion of said rotation of said control lever, continuing to rotate said second support frame so that said main frame is raised further relative to the ground level.

19. The method of claim 17, wherein said first and second portions of said rotation of the control lever in connection with a completion of a run over ground to be worked, so that said soil working tools are first disengaged from the ground and then the first support frame is lifted.

\* \* \* \* \*